United States Patent Office 3,432,261
Patented Mar. 11, 1969

3,432,261
WATER-SOLUBLE POLYPHOSPHATE AND METHOD OF PREPARATION
George Ewart and John Stewart Raitt, Edinburgh, Scotland, assignors to Scottish Agricultural Industries Limited, Edinburgh, Scotland
No Drawing. Filed Mar. 16, 1966, Ser. No. 534,675
Claims priority, application Great Britain, Mar. 25, 1965, 12,755/65
U.S. Cl. 23—107                                  9 Claims
Int. Cl. C01b 25/28; C02b 5/00

ABSTRACT OF THE DISCLOSURE

A novel water-soluble chain polymer polyphosphate having a high calcium sequestering power and suitable as a water softening agent is made by treating normally water-insoluble potassium metaphosphate with a boiling aqueous solution of a water-soluble salt, such as the chloride or nitrate, of ammonium, amine or alkali metal other than potassium, and subsequently precipitating the polyphosphate.

DISCLOSURE

The present invention relates to water-soluble polyphosphates and to a process for their manufacture.

Alkali metal polyphosphates and phosphate glasses are well-known and have found use in many applications. One such application is in water softening, in which the water-soluble phosphate sequesters calcium and magnesium without precipitating these metals. The water is thereby softened and made suitable for washing or other purposes requiring soft water.

Potassium Kurrol's salt (potassium metaphosphate) is a polyphosphate but by itself is not suitable as a water-softening agent since it is insoluble in water. In the past various means have been adopted to make water-softening agents from it. For instance the insoluble phosphate may be dissolved at ambient temperature in a strong acid or in an aqueous solution of a suitable water-soluble salt, for example sodium nitrate.

Such processes may often have the disadvantage that the polyphosphate may combine with water to form less complex phosphates which have substantially less or even none of the sequestering properties of water-soluble polyphosphates.

It has now been found that hitherto unknown water-soluble sequestering agents can be prepared from water-insoluble potassium metaphosphate by reacting it with a boiling aqueous solution of an ammonium salt an amine salt or a salt of an alkali metal other than potassium.

According to the present invention there is provided a water-soluble polyphosphate of potassium and ammonium and/or at least one amine and/or at least one alkali metal other than potassium, characterised in that the said polyphosphate is a chain polymer having a number average chain length of at least 20 phosphorus atoms, the said polyphosphate has a calcium-sequestering power per gramme of at least 0.035 g. calcium as determined in the standard test hereinafter described, and the ionic ratio of potassium to the other cations in the said polyphosphate is less than 4.0:1.0, and preferably is in the range 0.1:1.0 to 3.8:1.0.

Preferably the cations other than potassium are substantially all sodium; and the ionic ratio of potassium to sodium in this preferred polyphosphate is in the range 1.5:1.0 to 3.5:1.0.

According to the present invention there is also provided a process for production of a water-soluble polyphosphate as hereinbefore defined, which comprises treating potassium metaphosphate with a boiling aqueous solution of a water-soluble salt or salts of ammonium and/or at least one amine and/or at least one alkali metal other than potassium, for example the chorides or nitrates. The conditions of solution and of separation of the product should be such that the ionic ratio of potassium:other cations in the product is less than 4.0:1.0, and preferably is in the range 0.1:1.0 to 3.8:1.0, and that the product has a number average chain length of at least 20 phosphorus atoms.

For the preparation of the preferred potassium sodium polyphosphate the solution used to treat the potassium metaphosphate is preferably a sodium chloride solution which may conveniently contain 50 g. NaCl/litre.

Preferably the boiling is continued for at least a sufficient period of time substantially completely to dissolve the potassium metaphosphate.

It is desirable that the boiling should not be for any substantially longer period, because prolonged boiling causes hydrolysis of the metaphosphate to undesirable, less complex phosphates, i.e. orthophosphates and condensed phosphates having a number average chain length of less than 20 phosphorus atoms.

In the carrying out of the process of the invention small test samples of product may be withdrawn and their number average chain length of phosphorus atoms determined by end group titration.

If impure potassium metaphosphate is used in the process it may be necessary, after reacting the potassium metaphosphate and the said boiling aqueous solution, to filter the boiling mixture to remove solid impurities.

Preferably the boiled mixture, filtered if necessary, is allowed to cool sufficiently to permit the addition of a water-soluble neutral low-boiling organic liquid (preferably acetone or an alcohol) which causes precipitation of a viscous material. This solidifies on standing to yield the product. Separation and solidification can also be achieved by the addition of an aqueous solution of an alkali metal (including potassium) or ammonium salt or gaseous ammonia in place of the water-miscible organic liquid.

Alternatively, the initial filtrate can be allowed to cool to ambient temperature whereupon, on standing for a sufficient period of time, separation takes place into two liquid layers. A dense, viscous liquid is obtained as the lower layer and the solid product may be obtained from this layer in several ways. For instance the lower layer may be vigorously mixed with acetone until the solid product separates. In some cases it may be easier to dissolve the lower layer in a little water and then treat with acetone. Alternatively gaseous ammonia can be bubbled through the lower layer to precipitate the solid product.

If desired, the product after solidification may be separated by centrifuging or filtration, and then may be dried in an air oven or a vacuum oven or by washing with a water-miscible volatile organic liquid.

The calcium-sequestering power of the product is determined by the following method. 4 g. of product are dissolved in 1 litre of distilled water. A solution of calcium chloride is prepared by dissolving 1 g. of calcium carbonate in the minimum of hydrochloric acid, neutralising the excess acid to pH 7 with ammonium hydroxide and then making up the solution to 1 litre. 40 ml. of this solution are added to 50 ml. of the solution of the product and this mixture is made up to 200 ml. with distilled water. Air is bubbled through the solution, which is titrated with Wanklyn's soap solution to an endpoint where the surface of the solution is permanently covered with bubbles.

The invention is illustrated by the following examples.

EXAMPLE 1

A sodium-potassium polyphosphate according to the invention was prepared on a laboratory scale as follows.

A solution of 50 g. of sodium chloride in 1 litre of water was prepared and brought to the boil. 200 g. of crude potassium metaphosphate granules were added to the boiling solution and boiling was continued for 30 to 45 minutes with frequent stirring and breaking up of the plastic mass of undissolved material. As the end of this period evaporation losses were made up, the hot solution was filtered, and the filtrate allowed to cool to about 40° C. About 250 ml. of acetone were then added with vigorous stirring and the mixture was allowed to stand overnight. During this period the system separated into two phases. The lower phase was present sometimes as a solid and sometimes as an extremely viscous mass. In the latter case, a solid product was obtained by breaking up the mass and stirring. The product, about 140 g., was obtained by filtration and drying in a vacuum oven at 40° C. to 50° C.

The product was a white amorphous solid, readily soluble in water. Its analysis was: $P_2O_5$ 53.32%; $K_2O$ 20.62%; $Na_2O$ 7.67%. The ionic ratio of potassium:sodium was 1.8:1.

An end group titration of the product indicated a number average chain length in the range 100 to 200 phosphorus atoms. 1 g. of the product sequestered 130 ml. of standard calcium solution, equivalent to 0.052 g. Ca, when determined by the method hereinbefore described.

EXAMPLE 2

A sodium-potassium polyphosphate according to the invention was prepared on a laboratory scale as follows.

As in Example 1, the potassium metaphosphate was dissolved in the said aqueous sodium chloride solution. The hot solution, without making up evaporation losses was filtered. To the filtrate were added, with vigorous stirring, 100 g. of potassium chloride dissolved in the minimum volume of boiling water, and the final volume of the mixture was adjusted to 1 litre. On standing overnight the product settled out from the mixture either as a solid or as a viscous lower layer. In the latter case the product readily solidified on stirring for about an hour. It was then isolated by filtering and dried in a vacuum oven.

The product had physical properties similar to those of the product obtained in Example 1. The analysis of the material was: $P_2O_5$ 51.28%; $K_2O$ 26.21%; $Na_2O$ 4.86%. The ionic ratio of potassium:sodium was 3.6:1.0.

EXAMPLE 3

An ammonium-potassium polyphosphate according to the invention was prepared on a laboratory scale as follows:

The method was that described in Example 2, except that the potassium metaphosphate was treated with a solution of 50 g. of ammonium chloride in 1 litre of water and the product was precipitated by the addition of a further 150 g. of ammonium chloride dissolved in the minimum volume of water. Before filtration of the product the volume of the solution was doubled by the addition of water and the solid was vigorously stirred to prevent entrainment of ammonium chloride in the product.

The product had properties similar to those of the product obtained in Example 1, its analysis being: $P_2O_5$ 58.2%; $K_2O$ 7.3%; N 8.5%. The ionic ratio of potassium:ammonium was 0.27:1.0.

EXAMPLE 4

An alkyl ammonium-potassium polyphosphate according to the invention was prepared on a laboratory scale as follows.

Pure potassium metaphosphate (200 g.) was added to a boiling solution of ethylene diamine dihydrochloride (50 g.) in water (1000 ml.). The suspension was boiled, with stirring, for about 45 minutes, evaporation losses being continuously made up with water. During boiling an oily layer, which was not observed in the preparation of the products of the other examples, was present. At the end of the boiling period the mixture was allowed to cool slightly and was filtered. The filtrate containing both liquid phases was transferred to a separating funnel and was allowed to stand overnight.

The lower layer containing the sequestering material was removed and stirred with acetone (250 ml.) to produce a solid material which had a high chloride content. To reduce the chloride content the solid material was extracted with a 20% aqueous solution of acetone. The product, about 100 g., was obtained by filtration and had properties similar to those materials produced in the previous examples, its analysis being: $P_2O_5$ 56.9%; N 6.0%; $K_2O$ 16.4%; $Cl^-$ 0.2%. The ionic ratio of potassium:ethylene diamine was 1.63:1.0.

EXAMPLE 5

A potassium-sodium polyphosphate according to the invention was prepared on a laboratory scale as follows.

The method was that described in Example 1, except that the product was precipitated by bubbling gaseous ammonia through the cooled filtrate for a period of four hours. The product was obtained as a solid cake and was isolated by the method described in Example 1.

The analysis of the product was: $P_2O_5$ 53.77%; $K_2O$ 20.02%; $Na_2O$ 8.74%; N<0.5%. The ionic ratio of potassium:sodium was 1.5:1.0.

EXAMPLE 6

A potassium-sodium polyphosphate according to the invention was prepared on a laboratory scale as follows.

The preparation and filtration of the extract was the same as described in Example 1. The extract, as such, was allowed to stand for several hours, during which time it separated into two liquid layers. The lower layer was a dense viscous liquid (density 1.3 g./ml.) and it contained substantially all the sequestering power of the system and at least 70% of the dissolved $P_2O_5$ of the system. A higher percentage (up to 95%) of the dissolved $P_2O_5$ of the system was obtained in the lower layer if the salt concentration was increased from 5% to 10%, after the solution was filtered and before the filtrate was allowed to cool. The lower layer was removed and mixed with 50 ml. of acetone, using a powerful stirrer, the acetone being decanted after stirring for about 15 minutes. This procedure was repeated until a solid product was obtained, a total volume of 250 ml. of acetone usually being required. The product was identical with that obtained in Example 1.

EXAMPLE 7

A potassium-sodium polyphosphate was prepared as follows: 200 g. of potassium metaphosphate were boiled with an aqueous solution of 25 g. of sodium chloride in 1 litre of water, following the procedure described in Example 1. In contradistinction to Examples 1 to 6, when the resulting filtrate was allowed to cool no layer separation took place. The product could be obtained directly from this filtrate by any of the techniques described in Examples 1 to 6.

What we claim is:

1. A water-soluble polyphosphate of potassium and at least one cation selected from the group consisting of ammonium, amines and alkali metals other than potassium, characterised in that the said polyphosphate is a chain polymer having a number average chain length of at least 20 phosphorus atoms, the said polyphosphate has a calcium-sequestering power per gramme of at least 0.035 g. calcium and the ionic ratio of potassium to the other cations in the said polyphosphate is less than 4.0:1.0.

2. A water-soluble polyphosphate according to claim 1 in which the said ionic ratio is in the range 0.1:1.0 to 3.8:1.0.

3. A water-soluble polyphosphate according to claim 1 in which the cations other than potassium are substantially all sodium.

4. A water-soluble polyphosphate according to claim 3 in which the ionic ratio of potassium to sodium is in the range 1.5:1.0 to 3.5:1.0.

5. A process for the production of a water-soluble polyphosphate according to claim 1 comprising: mixing an aqueous salt solution containing 25–50 grams per litre with 4 to 8 times this quantity of potassium metaphosphate, said salt being selected from the group consisting of water-soluble salts of ammonium, amines and alkali metals other than potassium; boiling for up to 45 minutes and only long enough to dissolve the potassium metaphosphate but not long enough to effect hydrolysis of the potassium metaphosphate to undesirable, less complex phosphates; filtering the resulting solution; and precipitating the product as a solid from the filtrate by adding a precipitating medium selected from the group consisting of water-soluble neutral low-boiling alcohol and acetone; and aqueous solutions of alkali metal salts, aqueous solutions of amine salts and gaseous ammonia.

6. A process as in claim 5 in which the salt is selected from the group consisting of chlorides and nitrates.

7. A process as in claim 6 in which the salt is sodium chloride.

8. A process as in claim 5 in which the precipitating medium is added directly to the filtrate.

9. A process as in claim 5 in which the filtrate is cooled and let stand to separate into two liquid layers and in which the precipitating medium is added to the lower layer after separation of the two layers.

References Cited

UNITED STATES PATENTS 2,405,276   8/1946   Taylor _____ 210—23

OSCAR R. VERTIZ, *Primary Examiner.*

L. A. MARSH, *Assistant Examiner.*

U.S. Cl. X.R.

252—175